United States Patent [19]
Roberts

[11] Patent Number: 5,946,688
[45] Date of Patent: Aug. 31, 1999

[54] EXTENDABLE DATA STORAGE SYSTEM AND METHOD FOR STORING RELATIONSHIPS BETWEEN UIDS

[75] Inventor: Michael G. Roberts, Waikoloa, Hi.

[73] Assignee: Canon Kabuskiki Kaisha, Tokyo, Japan

[21] Appl. No.: 08/956,714

[22] Filed: Oct. 23, 1997

[51] Int. Cl.[6] .................................................. G06F 17/30
[52] U.S. Cl. ................................... 707/10; 707/3; 707/7; 365/185
[58] Field of Search .................................. 707/3, 8, 10, 7, 707/2, 103, 104, 501, 6, 203, 204; 395/200, 500; 371/49; 345/335; 364/243, 245; 365/185

[56] References Cited

U.S. PATENT DOCUMENTS

| | | |
|---|---|---|
| 3,916,387 | 10/1975 | Woodrum ..................................... 707/3 |
| 4,086,628 | 4/1978 | Woodrum ..................................... 707/7 |
| 5,508,957 | 4/1996 | Momodomi et al. .................... 365/185 |
| 5,862,325 | 1/1999 | Reed et al. ................................ 707/10 |

*Primary Examiner*—Wayne Amsbury
*Assistant Examiner*—Thu-Thao Havan
*Attorney, Agent, or Firm*—Paul Hentzel

[57] ABSTRACT

A system of data storage tables (10A) include an extendable subject table (12) for storing subject UID entries, and an extendable element table (16) for storing UID element entries and aggregate UID entries and role UID entries. The UIDs stored in the tables specify relationships between the UIDs, and collectively define a tangle (10B) of connecting paths. The tangle spreads out between subject nodes corresponding to subject UIDs, and aggregation nodes corresponding to aggregate UIDs, and role nodes corresponding to role UIDs. Each subject node and aggregation node and role node is path connected through the tangle to other subject UIDs and aggregate UIDs and role UIDs defining the relationship between the UIDs in the tables.

33 Claims, 5 Drawing Sheets

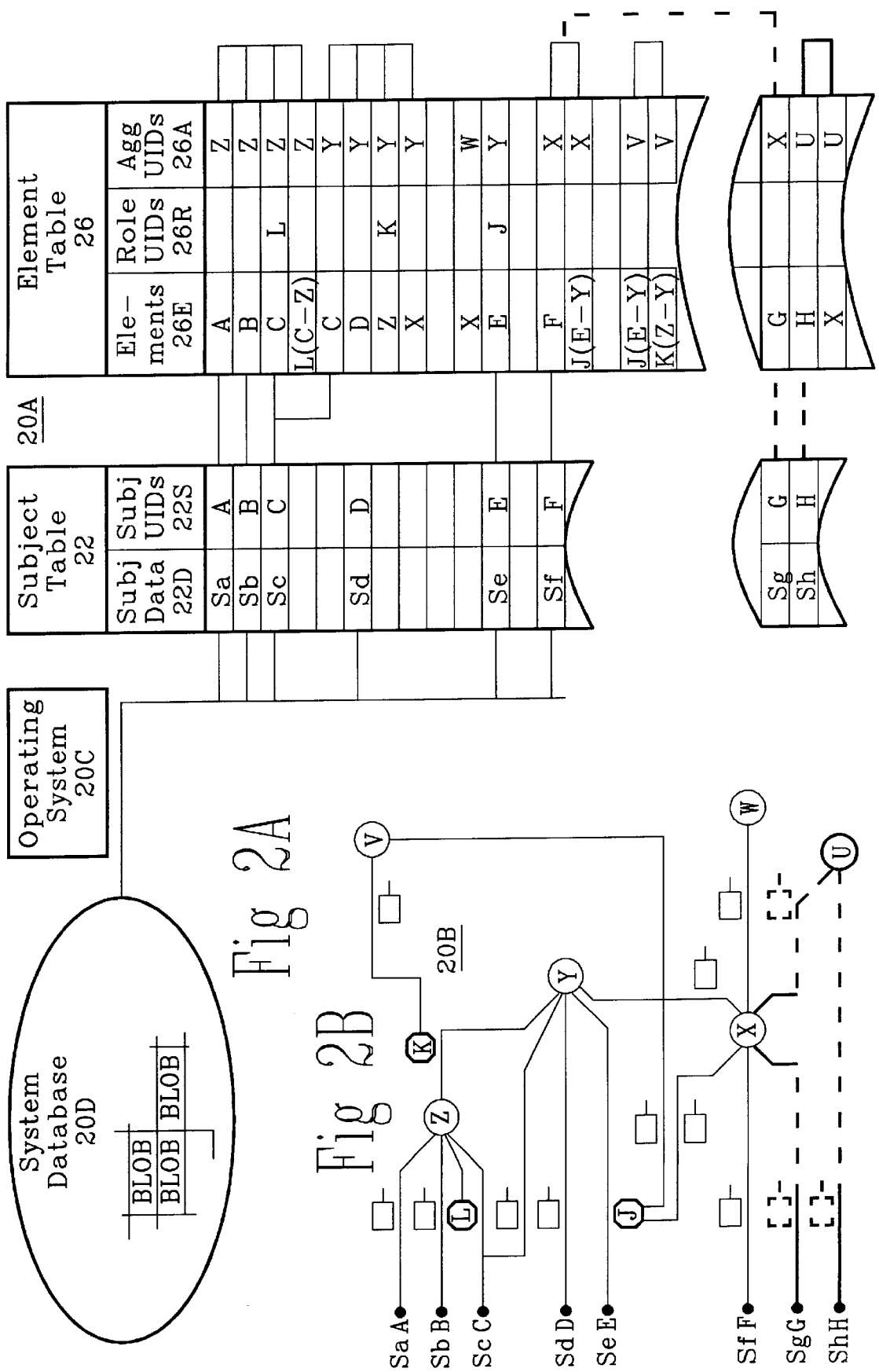

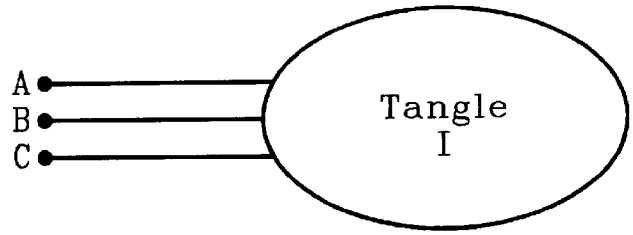
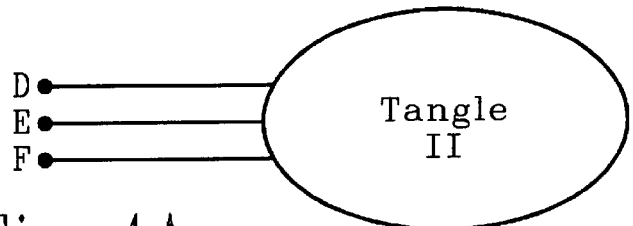
Fig 4A
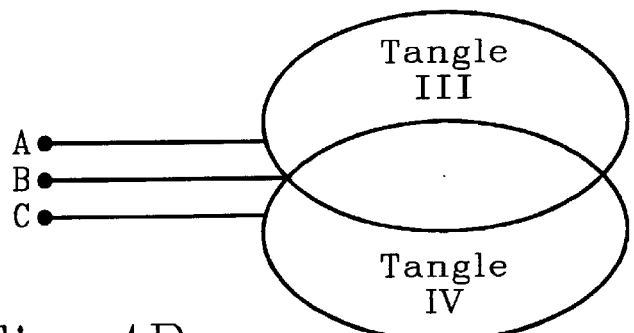
Fig 4B
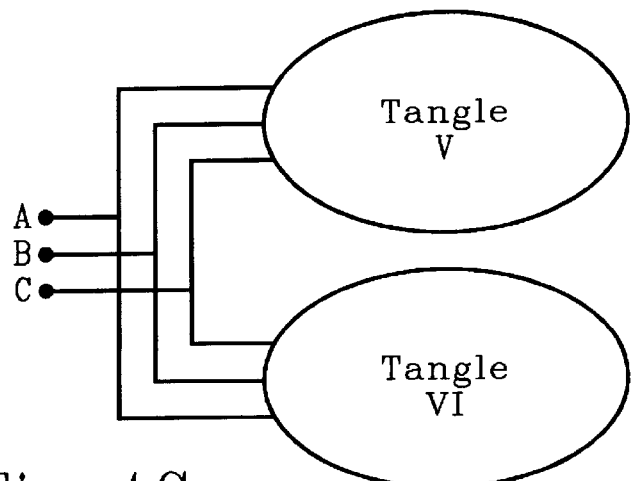
Fig 4C

5,946,688

EXTENDABLE DATA STORAGE SYSTEM AND METHOD FOR STORING RELATIONSHIPS BETWEEN UIDS

TECHNICAL FIELD

This invention relates to UID storage systems for specifying relationships between the UIDs, and more particularly to such storage systems which are extendable to receive new UIDs specifying new relationships between the UIDS.

BACKGROUND

Heretofore, conventional data bases had a rigid organization preserving simple pre-determined relationships between data entries. The organization was typically based on data field constraints which defined data relationships. Data in these earlier data bases were limited to a fixed range of complexity. The layout of the data base was designed to retain a relationship structure of pre-determined repeating patterns. All new entries of additional data had to accommodate the existing limited relationship structure. Alternative relationship structures of a different or more complex nature were not available without reformatting major sections of the data base.

SUMMARY

It is therefore an object of this invention to provide an extendable UID storage system and method for storing UIDs and providing UID connections which specify relationships between the UIDs.

It is another object of this invention to provide such an UID storage system which may be extended indefinitely for receiving additional UIDs specifying additional relationships of increasing complexity between the UIDS.

It is a further object of this invention to provide such an UID storage system and method which specify the relationship between each new UID and the existing UIDs as the system is extended.

It is a further object of this invention to provide such an UID storage system and method for storing UIDs which define a tangle of connecting paths between the UIDs.

It is a further object of this invention to provide such an UID storage system and method in which the tangle of connecting paths has fractal relationship structures.

Briefly, these and other objects of the present invention are accomplished by providing an extendable system of tables for storing subject UIDs and aggregate UIDs and role UIDs. The table system defines an expandable tangle of connecting paths between subject nodes and aggregation nodes and role nodes, specifying relationships between the nodes. The subject UIDs define subject nodes within the tangle of connecting node paths. The subject nodes are path connected through the tangle to other subject nodes defined by other subject UIDs. The aggregate UIDs define aggregation nodes within the tangle of connecting paths. Each aggregate UID has an aggregation of UID elements. The role UIDs provide role UID connections between other UIDs, defining role nodes within the tangle of connecting paths. A subject table has a subject column of rows with subject UIDs stored therein. An element table has an element column of rows with UID elements stored therein. The stored UID element is either a subject UID connected to an identical subject UID in the subject table, or an aggregate UID, or a role UID. The element table also has an aggregate column having rows with aggregate UIDs stored therein. The element table also has a role column having rows with role UIDs stored therein. Identical aggregate UIDs in the aggregate column determine the aggregation of UID elements for that aggregate UID, which includes the UID elements in the element column along the same row as each of the identical aggregate UIDs. The UID elements stored in the rows of the element column include all of the subject UIDs stored in the subject table, fold-back aggregate UIDs, and fold-back role UIDs. Fold-back aggregate UIDs are aggregate UIDs folded-back from a row in the aggregate column into a different row of the element column to create an aggregate UID to aggregate UID connection. Fold-back role UIDs are role UIDs folded-back from a row in the role column into a different row of the element column to create a role UID to aggregate UID connection. The aggregation of UID elements belonging to each aggregate UID folded-back into the element column form a single element belonging the aggregation of the aggregate UID stored in the aggregate column along the same row as that fold-back aggregate UID. Each fold-back aggregate UID creates an aggregation within an aggregation within the tangle of connecting paths. The role UID connection provided by each role UID in the role column and identical fold-back role UID in another row of the element column, is between an aggregate UID in the aggregate column and an existing element relationship between an UID element and an aggregate UID. Each fold-back role UID creates a role connecting path within the tangle of connecting paths. The columns of the subject table and the element table are extendable without constraint by adding rows of UIDs. The added UIDs expand the tangle of connecting paths increasing the number of connections and advancing the complexity of relationships between subject nodes and aggregation nodes and role nodes defined by subject UIDs and aggregate UIDs and role UIDs.

BRIEF DESCRIPTION OF THE DRAWING

Further objects and advantages of the present storage system and method and the operation and extension of the storage tables will become apparent from the following detailed description and drawing in which:

FIG. 2A is a block diagram of a system of extendable UID storage tables with subject data column 22D interfacing with system data base 20D;

FIG. 2B is a node diagram of the tangle of relationships defined by the storage tables of FIG. 2A;

FIGS. 4A 4B and 4C are simplified diagrams showing various relationships between subject nodes and a pair of tangles.

Figure 1A:
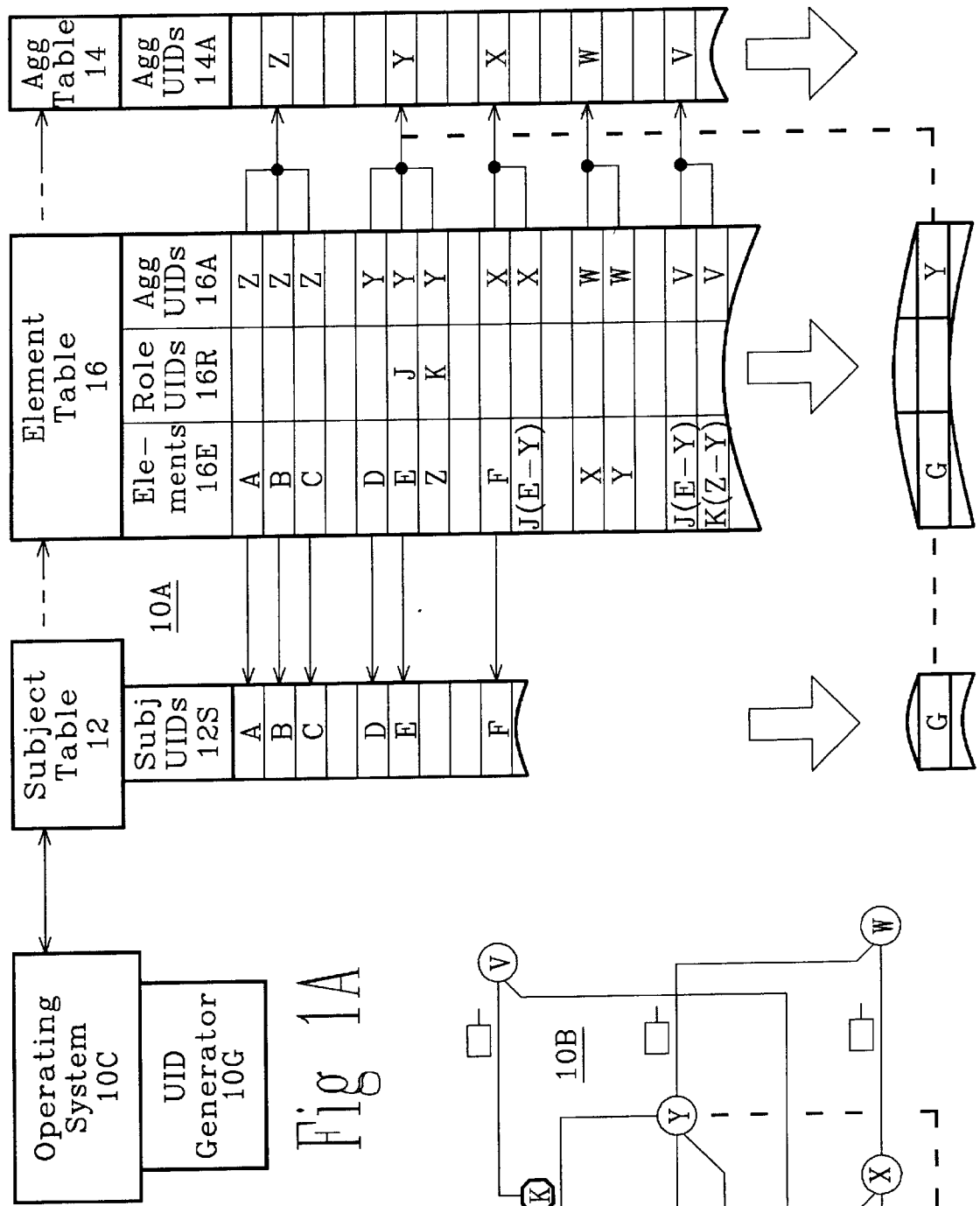
FIG. 1A is a block diagram of a system of extendable UID storage tables specifying relationships between subject UIDs.

The elements of the invention are designated by two digit reference numerals in the above figures. The first digit indicates the figure in which that element is first disclosed or is primarily described. The second digit indicates like features and constructions throughout the figures. Some reference numerals are followed by a letter which indicates a sub-portion or related feature of that element.

The table below lists the reference numerals employed in the figures, and identifies the element designated by each numeral.

10A storage table system 10A
10B tangle of connecting paths 10B
10C operating system 10C
10G UID generator 10G
12 subject table 12
12S subject column 12S
14 aggregation table 14
14A aggregate column 14A
16 element table 16
16E element column 16E
16A aggregate column 16A
16R role column 16R
20A storage table system 20A
20B tangle of connecting paths 20B
20D system data base 20D
22 subject table 22
22S subject UID column 22S
22D subject data column 22D
26 element table 26
26E element column 26E
26A aggregate column 26A
26R role column 26R
30 tangle 30
38E edge boundary 38E
38N interior region 38N
38P primary fractal region 38P
38S secondary fractal region 38S

GLOSSARY OF TERMS

Table—a memory allotment for storing UIDs and their relationships with each other (if any) in table format. The allotment may be located in one region of the memory with sequential addresses for convenient assembly of the table, or distributed throughout the memory.

Column—a portion of the table memory allotment in column format within the table for grouping UIDs having the same subject or aggregate or role function within the UID relationships.

Tangle—a visual representation of the UID relationships specified by the tables showing subject nodes corresponding to subject UIDs, and aggregate nodes corresponding to aggregate UIDs, and role nodes corresponding to role UIDS.

Subject—a datum or data cluster which is defined as a unit within a data base. Each subject is identified within the tables by a unique subject UID, and represented in the tangle by a corresponding subject node.

Aggregation—a collection of individually addressable elements which permit multiple inclusion of each element into the aggregation. An aggregation is a variation of a classical set which does not permit multiple inclusion. Each aggregation is identified within the tables by a unique aggregation UID, and represented in the tangle by a corresponding aggregation node.

Aggregate Fold-Back Connection—A location connection in the element table, between an aggregate fold-back UID in the aggregate column and an element in the element column, in a different row as the aggregate fold-back UID.

Element Connection—A location connection within the element table, between an element in the element column and an aggregation UID in the aggregate column, along the same row as that element.

Role—creates a relationship between an aggregation and an underlying element connection. Each role is identified within the tables by a unique role UID, and represented in the tangle by a corresponding role node.

Role Fold-Back Connection—A location connection in the element table, between an element connection along the same row as a role UID in the row column, and a fold-back UID in the element column of a different row.

Nascent Location—a vacant place keeping location in the role column of the element table, which may later contain a role fold-back UID.

Identical UID—refers to the multiple appearance of the same UID at various locations in the tables.

Inter-Table Subject Connection—An UID connection between a subject UID in the element column of the element table, and the identical subject UID in the subject UID column of the subject table.

Inter-Table Aggregation connection—An UID connection between an aggregate UID in the aggregate column of the element table, and the identical aggregate UID in the aggregation table.

Memory Interface Connection—An UID connection between a subject datum in the subject data column of the subject table, and the related data in the system data base.

Figure 1B:
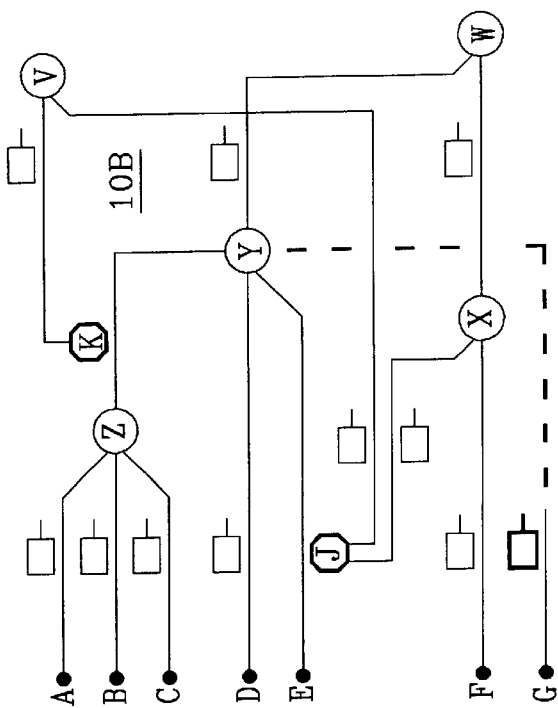
FIG. 1B is a node diagram of the tangle of relationships defined by the storage tables of FIG. 1A.

GENERAL EMBODIMENT—FIGS. 1A and 1B

Storage table system 10A (shown in the block diagram of FIG. 1A) includes three extendable data storage tables, subject table 12 and aggregation table 14 and element table 16. Subject table 12 stores subject UID entries. Aggregation table 14 stores aggregate UID entries. Element table 16 stores UID element entries, aggregate UID entries, and role UID entries. An UID is a unique identifier for each entry, and is typically a binary number similar to a memory address. Each UID entry in the tables is therefore different. However, most UIDs appear in more than one table. Each subject UID appears once in subject table 12, and also appears as an UID element in element table 16. Likewise, each aggregate UID appears once in aggregation table 14, and may appear many times as an UID element in element table 16. The UIDs stored in the three tables specify relationships between the UIDs, and collectively define a tangle of connecting paths 10B (shown in the node diagram of FIG. 1B) which depict these relationships. The tangle spreads out between:

subject nodes (black dots)
  which correspond to subject UIDs, and
aggregation nodes (circles with letters)
  which correspond to aggregate UIDs,
role nodes (octagons with letters)
  which correspond to role UIDs, and
nascent role nodes (squares without letters)
  which correspond to vacant locations in row column 16R of element table 16.

The tangle is a visual aid which provides the reader with a visual depiction of the relationships (if any) between each node and other nodes in the tangle.

Subject table 12 has subject column 12S of rows, which may be extended indefinitely to include more subject UIDs as indicated by the downward arrow under subject table 12. Each row stores a subject UID which further identifies a subject datum such as a data base BLOB (shown in FIG. 2A) for processing and retrieval. Each subject UID is represented in the FIG. 1A tables by a beginning alphabet character (A, B, C . . . ). Each subject UID defines a corresponding subject node (black dot) within the tangle of connecting node paths, represented by the same alphabet character (A, B, C . . . ) in FIG. 1B. Each subject node is path connected through the tangle to other subject nodes corresponding to other subject UIDs stored in the subject table. The relationship between the subject UIDs is specified by the UIDs in the three tables as depicted in the corresponding connecting paths of the tangle.

Aggregation table 14 has aggregate column 14A of rows, which also may be extended indefinitely to include more subject UIDs as indicated by the downward arrow. Each aggregate UID is represented in the FIG. 1A tables by an ending alphabet character ( . . . X, Y, Z). Each aggregate UID defines a corresponding aggregation node within the tangle of connecting node paths, represented by the same alphabet character ( . . . X, Y, Z) in FIG. 1B. The aggregate UIDs define aggregations of elements formed by subject UIDs, role UIDs, and other aggregate UIDS.

Element table 16 has columns of rows which also may be extended indefinitely as indicated by the arrow. Element table 16 has element column 16E, aggregate column 16A, and role column 16R. Each row of element column 16 stores an UID element which is either a subject UID based on an identical subject UID in subject table 12, or an aggregate UID or a role UID. The UID elements have corresponding node elements distributed across FIG. 1B which are either subject nodes or aggregation nodes or role nodes. Each row of aggregate column 16A stores an identical aggregate UID to an aggregate UID in aggregation table 14.

Some rows of role column 16R either store a role UID defining a role node or contain a nascent vacant location defining a nascent role node. The role UIDs provide a role connection between an element connection along the same row as a role UID in the row column, and a fold-back UID in the element column of a different row. Each role UID is represented in the FIG. 1A tables by a middle alphabet character ( . . . J, K, . . . ), and defines a corresponding role node represented in FIG. 1B by an octagon containing the same middle alphabet character ( . . . J, K, . . . ). The nascent vacant location has no present effect on the UID relationships or the tangle of connecting paths. These vacant locations merely save a place in the role column for a future role UID. Each nascent vacant location identifies a corresponding nascent role node represented by an empty square in FIG. 1B. Both the nascent role squares and role octagons of FIG. 1B are depicted as floating over the underlying node to node connecting path in synapse like fashion. The role octagons are in relationship with the underlying path, but do not connect with or form a branch with the underlying path.

Fold-Back Connections

The UID elements stored in the element column form the elements of the aggregation nodes, and include:

1) the subject UIDs
    stored in the subject table,
2) fold-back aggregate UIDs
    which are aggregate UIDs folded-back from a row in the aggregate column into a different row of the element column creating an aggregate UID to aggregate UID connection, and
3) fold-back role UIDs
    which are role UIDs folded-back from a row in the role column into a different row of the element column creating a role UID to aggregate UID connection.

Each fold-back entry creates another row in the element table, and adds another connection to the aggregation table and possibly another entry in the aggregation table. Each fold-back aggregate UID produces a corresponding aggregation node to aggregation node connecting path in the tangle. Each of these aggregate fold-back paths create an aggregation within an aggregation relationship. The aggregation of UID elements belonging to each aggregate UID folded-back into the element column, form a single composite element belonging the aggregation of the aggregate UID stored in the aggregate column along the same row as that fold-back aggregate UID. Each fold-back role UID produces a corresponding role node in the tangle, along with a corresponding role fold-back path which connects the role node to other nodes within the tangle. The role UID connection provided by each role UID in the role column and identical fold-back role UID in another row of the element column creates a role relationship. This created role relationship is between an aggregate UID in the aggregate column and the existing underlying element relationship between an UID element and an aggregate UID. Folding back creates higher level relationships between relationships such as aggregations of aggregations. Many iterations of folding back into the element column results in an enormously complex tangle having a meta-structure of relationships which may "go fractal" as described in a later section entitled "FRACTAL TANGLES" and shown in related FIG. 3. A high level fractal tangle is not unlike the complex network of axon-to-dendrite synapses existing between brain neuron cells.

Aggregations of Elements

Each UID element stored in the element column is an element belonging to the aggregation of a particular aggregation node. The element may be either a subject UID or an aggregate UID or a role UID, and the aggregations may be formed by any combination of the above elements. Aggregation membership for each occurrence of an element is specified by connection with the aggregate UID stored in the aggregate column along the same row as that occurrence of the element. Each subject UID in the element column has an inter-table subject UID connection with an identical subject UID in the subject table. Each aggregate UID in the aggregate column of the element table, has an inter-table aggregate UID connection with an identical aggregate UID in the aggregation table. These inter-table connections connect between aggregate column 16A and aggregation table 14, and correspond to connecting paths within the interior of the tangle. Aggregate UIDs in the aggregate column have inter-table aggregation connections with identical aggregate UIDs in the aggregation table. Multiple appearances of an aggregate UID in the aggregate column specify an aggregation of elements from the UIDs stored in the element column along the same rows with the aggregate UID. The number of elements in a the aggregation for a given aggregation node is equal to the number of times the aggregate UID for that aggregation node appears in the aggregate column of the element table. In FIG. 1A for instance, the three appearances of aggregation node Z in aggregate column 16A specify the three element aggregation A, B, and C from the A, B and C UIDs stored in element column 16E along the same rows with the Z aggregate UIDs. This A+B+C=Z aggregation is shown in FIG. 1B by three subject paths merging at node Z. The aggregation node Y also appears three times in aggregate column 16A specifying a Y aggregation of elements which includes subject element D and subject element E plus the entire Z aggregation. That is Y aggregation=D+E+Z.

Aggregate UID Z is folded-back into element column 16E to form a element connection with aggregate UID Y, as shown in FIG. 1B by corresponding aggregate fold-back path connecting aggregation node Z to aggregation node Y. Other aggregation relationships specified by the FIG. 1A tables and shown in the FIG. 1B tangle 10B are:

J(E−Y)+F=X aggregation,

X+Y=W aggregation, and

J(E−Y)+K(Z−Y)=V aggregation.

Aggregate UIDs V, W, and X each appear only twice in aggregation node column 16A. Therefore aggregations V and W and X each have only two elements. Conversely, the number of appearances of an UID in the element column determines the number of aggregations to which that UID belongs (except for multiple inclusion situations—see Multiple Inclusion section). In FIG. 2A for instance, aggregate UID X appears three times as an element in element column 26E. Aggregate UID X is therefore an element of three different aggregations: aggregation Y and aggregation W and aggregation U as shown in tangle 20B of FIG. 2B.

The number of connecting paths from a given aggregation node towards other aggregation nodes is equal to the number of fold-backs of the aggregate UID for that given aggregation node into the element column of the element table. That is, an additional aggregate UID to aggregate UID connection and an additional aggregation within an aggregation is created for each additional fold-back of an aggregate UID into the element column. These fold-backs may be due to additional appearances in the element column of the identical fold-back aggregate UID, or to additional appearances in the element column of a fold-back role UID for that aggregate UID. In FIG. 1A for instance, aggregate UID Z is folded-back twice, once by the aggregate UID Z shown in column 16E as Z, and once by the role UID K shown in column 16E as K(Z−Y). Aggregation Z is therefore a member of both aggregation V and aggregation Y. Aggregate UID X has only one fold-back (by the X UID) and is a member of only one aggregation (aggregation W). Aggregate UID Y also has only one fold-back (by the Y UID) and is a member of only one aggregation (aggregation W). Aggregate UIDs W and V do not have any fold-backs, and therefore are not members of any aggregation.

Role Connections

A role node allows for the creation of relationships which involve a specific indirect relationship between an aggregation node and a pre-existing underlying element connection. An element connection is between an element node (UID element in the element column) and an aggregation node (aggregation UID in the aggregate column). UIDs nodes create the relationship connection between the element and the aggregate UID along the same row therewith.

The role UID connection provided by each role UID in the role column and the identical fold-back role UID in the element column, concerns an existing element connection and a new role fold-back connection. The existing element connection is between the UID element in the element column along the same row as the role UID, and the aggregate UID in the aggregate column also along the same row as the role UID. The new role fold-back connection is between the fold-back role UID in the element column and the aggregate UID in the aggregate column along the same row as the fold-back role UID in the element column. Each element connection and role fold-back connection of table system 10A (FIG. 1A) has a corresponding node path and fold-back path in tangle 10B (FIG. 1B). The number of connecting paths from a given role node towards the aggregation nodes in tangle 10B, is the node path plus the number of fold-back iterations of the role UID for that given role node into element column 16E of element table 16. That is, an additional new fold-back path is formed for each additional appearance of a fold-back role UID in the element column for creating an additional relationship of an aggregate UID to an UID element. In FIGS. 1A and 1B for instance, role UID K is folded-back to the element column once, and corresponding role node K is involved in two node paths, an element node path from Z to Y and an fold-back path from K to V. Further, role UID J is folded-back to the element column twice, and the corresponding role node J is involved in three node paths, an element path to Y, a fold-back path to V, and another a fold-back path to X.

TABLE EXTENSION—FIGS. 1A, 1B, 2A and 2B

The columns of the subject table and the aggregation table and the element table may be extended without constraint by adding rows of UIDs. The added rows increase the number and advance the complexity of the UID connections between the UIDs stored in the tables. Each added row expands the size and complexity of the tangle of connecting paths between the subject nodes.

In FIG. 1A for instance, subject UID G has been added to subject table 12 and to element column 16E, and related aggregate UID Y has been added to aggregate column 16A (as shown by bold dashed lines in FIGS. 1A and 1B). Added subject G joins existing Y aggregation along with prior elements D, E, and Z. New subject UIDs are added to the subject table simply by entering the subject UID into a location along a new row at the bottom of the table just under the previously last subject UID. The relationship of a new subject UID to the tangle of existing subject UIDs is specified by a new role UID (if any) and a new aggregate UID (if any) entered at the same time as the new subject UID. New role UIDs are entered into role column 16R and new aggregate UIDs may be entered into aggregate column 16A and/or aggregation table 14 and/or element column 16E (forming a fold-back).

A more complex addition is shown by bold dashed lines in FIGS. 2A and 2B. Two subject UIDs have been added to subject table 22 (new subject UID G and new subject UID H). Three UID elements have been added to element column 26E (new subject UID G, new subject UID H, and existing aggregate UID X). Three aggregate UIDs have been added to aggregate column 26A (existing aggregate UID X, and two appearances of new aggregate UID U). The addition to the FIG. 2A tables creates the following new relationships:

new subject G joins existing aggregation X, new subject H becomes an element of new aggregation U, and existing aggregation X becomes an element of new aggregation U.

In general, new subject UIDs are connected into the existing tangle of connecting paths in a manner consistent with the information which the subject represents, and consistent with existing the relationships previously entered into the tangle. Initial steps of the extension process may include:

1) the appropriate UID connection of the new subject UID to the existing aggregations, 2) the establishment of new aggregations which include the new subject UID and/or other relationships which include the subject UID, and 3) the conversion of certain existing role UIDS (or nascent vacant locations) to new role UIDs, and the including of these existing and new role UIDs into new and existing aggregations.

The extension process may involve 1) the addition of new rows to element table 16, 2) the addition of new aggregate UIDs to aggregation table 14 and column 16A of the element table, 3) the specification of role UIDs for new and existing rows of the element table, and 4) the use of the new subject UID in column 16E along with new and existing row and aggregate fold-back UIDs therein.

These extensions of the UID tables may be made without any preliminary considerations concerning an overview of data analysis, selection of modeling parameters, or the nature of existing relationship structure. Any UID may be placed into any relationship with any other UID at any time in any order, completely free of constraints. The new relationship structure need not fit with the previously specified structure, and in fact may be inconsistent with previous structure. In prior data bases, inconsistencies were considered errors which should be sought out and corrected. In the present tangle meta-structure, inconsistencies are just another relationship structure to be retained for analysis, similar to murky thought process of the human mind.

Each new entry is meshed into the existing tangle of entries as required by the concurrent entry of supporting role UIDs and aggregate UIDs and fold-backs of each. The author of each new UID has a straight forward entry task. The author merely enters the UID in the last row at the end of the proper table(s).

Roberts Machine

The UID table system 10A of FIG. 1A and related path tangle 10B of FIG. 1B illustrate the principles of a Roberts machine which is a specialized type of Turing machine. The concept of a Turing machine developed in the early 1950s by Allen Turing involves a process plus memory for computing anything which is computable. Alan Turing was the seminal computer theorist and code breaker of the mid-twentieth century. A general Roberts machine performs limited aspects of a Turing machine, and like a Turing machine, requires a process for changing data and creating new data, plus memory for providing the data on which the change is based. Table system 10A is an embodiment of the memory portion only of a Roberts machine. The Roberts machine is optimized for creating and processing arbitrary information structures which relate anything to anything in anyway.

Document Control Example

One application of Roberts machine storage table system is document management for a complex information data base with multiple users. Each document (or set of related documents) is a subject with a subject UID in the tables and a corresponding subject node in the tangle. Aggregations of documents may be complied based on the information requirements of the users. Typical aggregations may concern features which certain documents have in common such as subject matter (keyword), name of author, control number etc., or completion status.

All of the authors contributing to a document data base may be identified by tracing one author from a subject in the data base, to a subject UID in the subject table, to an author aggregate UID in aggregation table. The elements of the corresponding author node include all of the contributing authors. Such an author node may be introduced when the system of tables is created, and updated as the tables extend and additional authors contribute to the document base. Alternatively, the author node may be added to the schema later, in bulk, as an author list feature. Likewise, all of the documents from a specific source such as a particular individual author, may be determined from a specific source node for that source or author.

The role UIDs and role nodes permit the documents to relate in various (and possibly inconsistent) ways. For instance, a budget report may refer to the anticipated cost of various an improved safety features proposed in a series of safety studies. Each of the safety studies may in turn refer to the cost analysis in the budget report. Some of the safety studies may refer to each other or to a basic earlier study. This reference relationship between documents may be accommodated in the tables by employing a reference role UID for each references. The role UID may operate on other classes of relationships, such as date of creation. Each day new documents are entered into the data base, introducing new subject UIDs and aggregate UIDs and role UIDs at the end of the tables (see dashed additions of FIGS. 1A, 1B, 2A and 2B). A Roberts machine may support a language application examining the syntax and other relationships between words and phrases in a particular text or in general use.

Multiple Inclusion (FIGS. 2A and 2B)

Under certain circumstances, an element may be included twice within the same aggregation. For example, subjects (individual documents) A and B and C may be three safety studies belonging to safety study aggregation Z. That is, A study+B study+C study=Z aggregation.

Study C refers to cost information in a current budget report, and is therefore slightly different (distinguishable) from studies A and B. The C element connection to Z has cost role UID L, which is not present in the element connections for study A or study B. The cost role UID is folded-back from the element connection to the element column forming element L(C–Z). Study C is included twice in the Z aggregation, once as a safety study, and once as a study with a cost reference. That is,

A+B+C+L(C–Z)=Z.

When the budget report is not longer current, the user replaces role UID L (both occurrences) with a nascent role UID, and the cost relationship is terminated. The table system permits element C to appear twice as a element in the element column and to be included twice in the Z aggregation. That is, A+B+C+C=Z bag.

This double element multiple inclusion produces a bag variation of an aggregation. In contrast, a classical set is a variation of an aggregation which does not permit multiple inclusions.

SUBJECT DATA—FIGS. 2A and 2B

Storage table system 20A (shown in FIG. 2A) has subject table 22 with a subject column 22S of rows and an adjacent subject data column 22D of rows. Subject datum (Sa, Sb, . . . Sf . . . ) stored in each row is identified by the subject UID stored along the same row therewith. Each subject datum has a memory interface connection to system data base 20D which by indirection permits the subject UIDs to identify system data for retrieval and processing. The data in data base 20D may be any information in various formats such as BLOBs (binary large objects) and ordinary ASCII codes. Small units of data may be stored in an on-table cache memory associated with the subject data (Sa, Sb, Sc . . . ) without memory interface connections to data base 20D. This cache memory may be along the same row as the subject data.

The relationship between the subject UIDs and the subject data and the system data is normally fixed. In contrast, the tangle of connecting node paths is fluid, and may be changed simply by extending the rows of the tables or editing the existing entries in the tables. The subject UIDs may be connected, disconnected and reconnected to the tangle of connecting paths by adding, subtracting, and changing aggregate UIDs and role UIDs and related fold-backs.

Subject UIDs (such as A–F of FIG. 1A) form the data input to the tables. These subject UIDs are part of the UID connections between tables and therefore are also part of the tangle. Subject Data (such as Sa–Sf of FIG. 1A) are outside the input to the table, and are not part of the UID connections nor part of the tangle. FIG. 2 shows storage system embodiment having both relationship structure (as shown in tangle 20B) and data (subject data column 22D). FIG. 1 shows a pure structure embodiment without subject data.

The inter-table subject connections extend between each subject UID in the element column and the identical subject UID in the subject table. Some subject UIDs have multiple appearances in the element column with multiple subject connections with the identical subject UID in the subject table. These multiple appearances create multiple relationships between the element column and the subject data. In FIG. 2A for instance, subject UID C appears twice in element column 26E creating two immediate relationships for subject datum Sc. Subject datum Sc may be identified in the table and in the tangle as belonging to two separate aggregations, for instance a safety report aggregation and an author aggregation.

Bootstrapping the System

Operating systems 10C and 20C (shown in FIGS. 1A and 2A) are suitable control devices such as CPUs with operating software for bootstrapping the system and interpreting the data retrieved from memory via subject data (Sa, Sb, Sc . . . ). Some UID entities added to the columns, such as axiomatic matters, require advance definition with advance entries. Such advance definition and related "bootstrapping" matters may be hardwired into the operating system. The operating system has a dedicated internal program memory which may be augmented by initial subject data and relationship structure (bootstrap table information) from the table system. The initial data may be written into the table system by the program memory within the operating system. Alternatively, the initial data may be provided a priori by an external source such as a dedicated user program.

Table and Column Embodiments

The embodiment of FIG. 1A, has a UID storage system with three discrete tables, subject table 12 and element table 16 and aggregation table 14. The tables have inter-table connections extending outwardly from each side of element table 16 to the other tables. Element table 16 has element connections within the table along each row thereof 16 (shown as element paths in FIG. 1B). Element table 16 also has fold-back connections (shown as fold-back paths in FIG. 1B). The embodiment of FIG. 2A, has two discrete tables, subject table 22 and element table 26, without an aggregation table. The FIG. 2A aggregate UIDs belonging to each aggregation are connected together by intractable UID connections between the rows of aggregate column 26A. The three table embodiment of FIG. 1A offers on-table row storage of aggregation related data in the aggregation table along the same row as each aggregate UID.

In a less delineated embodiment, a single composite table may be employed with inter-table connections, element connections, and fold-back UID connections between locations within a single table. The single composite table contains the three discrete tables distributed therein, forming the system of UID storage tables. The three tables are in effect "shuffled" together into a much longer single table. The single composite table may have rows which are three columns wide providing three locations to accommodate the element-role-aggregate trio of entries. Vacant locations may be employed along certain rows to implement the two column rows of the subject table and the one column row of the aggregation table.

Virtual Table/Column

The tables may be actual tables of locations each containing an aggregation of UID entries localized in storage (as shown in the Figures) having actual columns of rows. Alternatively, the tables may not be actual tables, but merely locations distributed throughout memory. Each row becomes a short data string. That is, the tables may be virtual tables distributed throughout the storage system, each containing an aggregation of UID entries. In a virtual table embodiment, the columns are virtual columns distributed in storage within the virtual tables. The rows may be variable length sequential fields in the memory.

Memory Pointers

The inter-table connections (indicated by inter-table arrows in FIG. 1A) may be implemented via suitable memory connectors such as pointers. Fold-back UID connections (shown in FIG. 1B) between aggregate column 16A and element column 16E or between role column 16R and element column 16E may also be memory pointers. Memory pointers may be established by the operating system through a software search for identical UIDs. An arbitrary start UID is selected and compared to the other UIDs stored in the storage tables. A memory pointer is established from (or to) a start UID to (or from) and any other UID which is identical thereto. Inter-table aggregation memory pointers connect between each aggregate UID in aggregate column 16A of element table 16 and the identical aggregate UID in aggregation table 14. These pointers may have direction, as indicated by the arrow heads pointing from element table 16 toward aggregation table 14. Subject memory pointers connect between each subject UID in element column 16E of element table 16 and the identical subject UID in subject table 12. These subject memory pointers also may have direction, as indicated by the arrow heads pointing from element table 16 toward subject table 12.

Complete UID Connection

A complete UID connection (and corresponding path connections) establishes a relationship between two subject data. A simple complete connection is specified by the connection between subject data Sa and Sb in the tables of FIG. 1A (and also of FIG. 2A) and illustrated in the tangle of FIG. 1A (and FIG. 2B). This complete connection includes:

- an initial inter-table subject connection from subject UID A in subject table 12 to subject UID A in element column 16E,
- an element connection along row A of element table 16 from subject UID A to aggregate UID Z,
- an inter-table aggregation connection from aggregate UID Z in row A of column 16A to aggregate UID Z of aggregation table 14,
- a return inter-table aggregation connection from aggregate UID Z of aggregation table 14, to row B aggregate UID Z of column 16A,
- a return element connection along row B of the element table 16 from aggregate UID Z to subject UID B, and
- a return inter-table subject connection from subject UID B in element table 16 back to subject UID B in subject table 12.

The aggregation Z connection in the three table embodiment of FIG. 1 (node Z in FIG. 1A) involves a single common location on aggregation table 14. The aggregation Z connection in the two table embodiment of FIG. 2 is merely an A-B-C intra-table aggregation connection between rows in the aggregate UID column. The complete subject-to-subject connection is the fundamental unit of the relationship structure between subjects.

Role nodes require active role UIDs for identification when folded-back into the element column. Nascent role nodes are not folded-back and do not require such identification. The UID location for a nascent role node may be a vacant location in role column 16R as shown in FIGS. 1A and 1B. The use of vacancies in place of unused UIDs can speed up UID searches during the operation of the system. However, nascent role nodes must remain available for possible folding back in the future, at which time they will become role nodes requiring role UIDs. Instead of being vacant, the UID location for each nascent role node may contain an inactive UID ready to become active when the nascent role node is folded-back. A fully packed storage configuration without vacant locations is established when an UID is stored in each row of each column of each table. All role locations contain either a nascent role UID or a role UID, and all rows contain UIDs.

Aggregate UID Generator

A suitable UID source, such as UID generator 10G (shown in FIG. 1A) may be employed for providing the UIDs stored in the tables. The UID source may provide UIDs during the initial creation for developing the schema of the tables. Thus the UID source may also provide UIDs as required for extension of the system of tables and corresponding expansion of the tangle of connecting node paths. A common generator for supplying all of the subject UIDs and all of the aggregate UIDs and all of the role UIDs, insures that each UID is unique and therefor separately identifiable from all of the other UIDS. The UID generator may systematically provide the UIDs on a sequential basis. Alternatively, the UID generator may provide the UID values on a random or pseudo-random as needed, so long as no values are repeated.

FRACTAL TANGLES—FIG. 3

Figure 3:
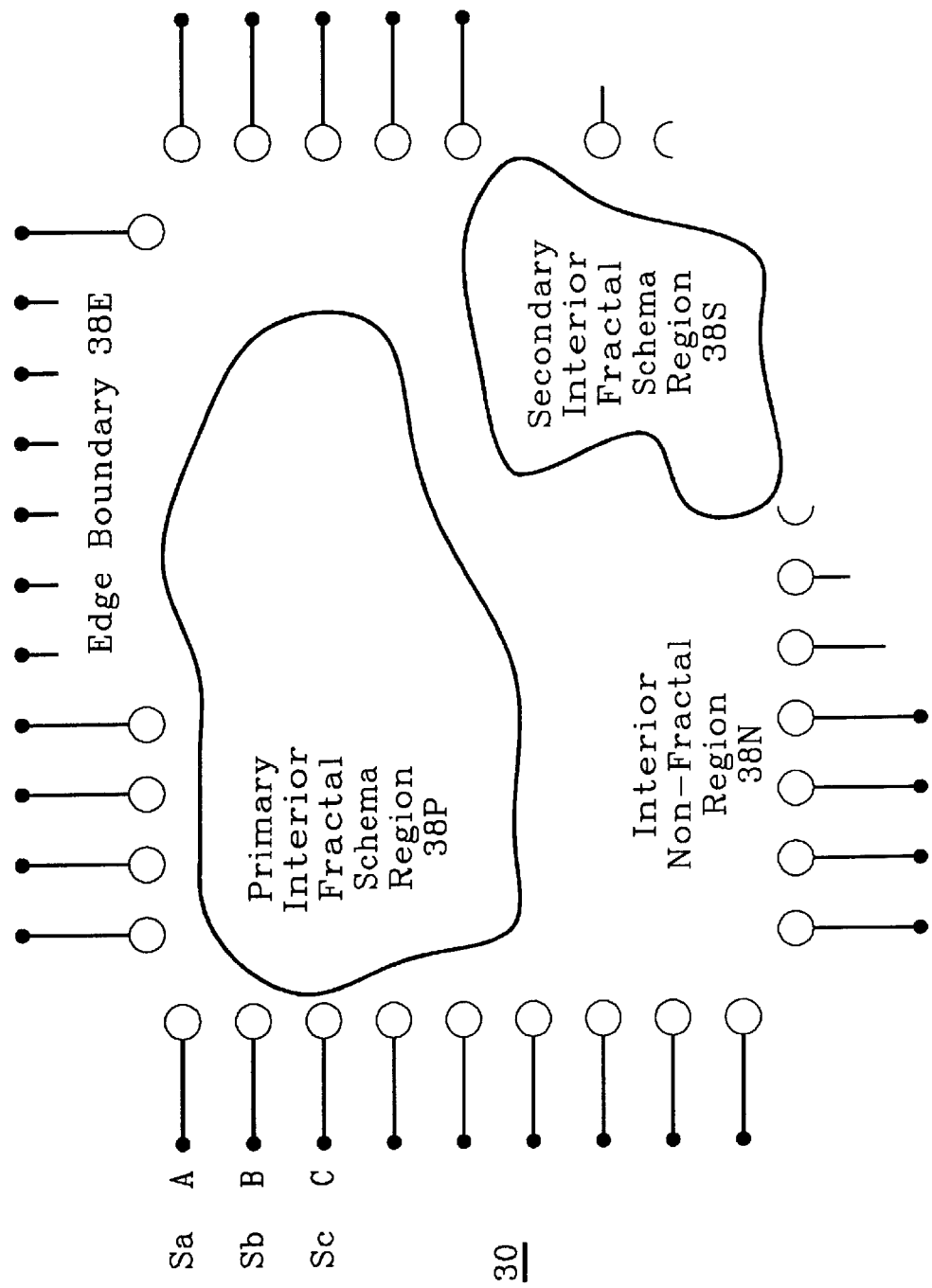
FIG. 3 is a conceptual rendition of a complex tangle having fractal regions and non-fractal regions.

The tangle of connecting node paths may be visualized as an area on a two dimensional plane as illustrated in FIG. 3 by tangle 30. Tangle 30 has an edge boundary 38E formed by subject nodes and edge connecting paths to aggregation nodes. Tangle 30 has an interior region 38N formed by the aggregation nodes and the role nodes and interior connecting paths. A tangle of connecting paths may have sufficient fold-back iterations of aggregation nodes and role nodes into the element column to create a high-iteration fractal relationship structure within the interior region.

Examples of Fractals

A fractal is commonly seen as a "kaleidoscopic" two-dimensional rendering of an image of a mathematically defined sub-two dimensional Mandelbrot set. Many mathematically defined families of fractals reside between one and two dimensions, or between two and three dimensions, or between higher order sequential integer dimensional values. The term fractal derives from the nature of these inter-dimensional mathematical objects, which have fractional dimension instead of the usual integer dimension of non-fractal geometric objects. When a fractal is viewed at some limit of resolution in scale, it appears self-similar in some regard to other portions of the fractal when viewed at other resolutions in scale. This self-similar fractal property holds over a wide range of scales. Mathematically defined fractals typically have no limitation on at least one end of this self-similarity range of scales. Real world fractals have limits at both ends of the self-similarity range of scales. For example in a two dimensional aerial or satellite photograph, irregular coastlines may not inherently reveal the zoom scale of the image. These coastlines appears similarly irregular over a broad range of zoom scales. As a further example, trees have many very similar branches over a range of scales from trunk to leaves. A two dimensional photograph of any single branch does not indicate the position of that branch in this range of scales. In three dimensions, the interior structure of mammalian lung tissue is virtually identical over a broad range of microscopic scales of magnifications. The tissue is a self-similar series of ever smaller openings formed in the sides of larger openings. However, the self-similarity breaks down when the lung is viewed as a whole at a large scale, or viewed as individual alveoli at a small scale.

Information Fractals

The UID relationships stored in the system of tables and visualized through the tangle may form an informational fractal of relationship structure and data. The tangle may contain relationships of relationships of relationships over a board range scales, such as from the edge of the tangle to the most complex relationships deep in the interior of the tangle. The term "small scale" in a tangle information fractal refers to relationship structures which directly involve or are not very far removed from subject nodes. The term "large scale" in a tangle information fractal refers to relationship structures which are very far removed from subject nodes. Small scale and large scale do not refer to a small or large number of elements in an aggregation. In general, small scale relationships concern low level data, while large scale relationships concern high level concepts. The fractal region of a tangle includes all regions having a sufficiently broad range of scales of relationships.

Mathematical/Real World Fractals

A mathematical fractal may exhibit a type of self-similarity in which the relationship structure at each scale is identical to other scales both smaller and larger. In contrast, a real-world information fractal may include relationships of relationships, where each relationship in the series is structurally identical to the relationships which form it and to which it belongs as an element, over some broad range of scales.

A mathematically defined fractal may be based on randomness or some other means for making each scale appear different, yet with sufficient structural integrity that self-similarity is evident. In contrast, a real-world information fractal may include relationships of relationships, where each relationship may be structurally different from the relationships which form it and to which it belongs as an element, over some broad range of scales. These information fractal relationships are all evidently part of the same family of relationships that together make-up the fractal; and possibly form a suitable progression of relationship structures that span from a small to large relationship structures.

Classes of Fractal Schema

The self-similarity schema of a fractal is the manner in which the structural integrity of the fractal is to be maintained (evolves of does not evolve) over the range of scale subsumed by the fractal. The fixed schema is the simplest form of fractal self-similarity. In fixed schema fractal regions, all of the relationships at all scales have identical structure. Scale-dependent schema is more complex. Here the structural nature of the relationships change, usually in some sense smoothly as the fractal progresses from small to large scales. The change is without regard for the data and structures contained at lower or higher levels except for the scale. Content-dependent schema are still more complex. The relationship structure evolves in accordance with the local surrounding data and structure. Amorphous fractals are the most complex. The structure may change without limitation except that a broad range of scale is involved. Other fractal schema are possible, including combinations of the above classes. For all classes of information fractal schema, there is no inherent restriction on the relationship structure of any constituent aggregation limiting the aggregation membership to only elements of the next lower scale. Indeed, aggregation may be formed which include elements from lower scales and higher scales. In each case, the applicable schema, if any, governs the appropriate constraints, not external limitations of design. The storage table system approach to storing UIDs provides unlimited ability to increase the scales of the fractal tangle by:

1) adding higher level relationships involving existing relationships and subjects as elements, and
2) replacing existing subjects by structure which disclose their constituent structure as formed of more basic subjects.

The storage tables also provide unlimited ability to create information fractals which fit any class of schema that may be imagined. The operating system may provide enforcement of fractal schema rules during construction of specific information fractals. Bootstrapping procedures within the tangle may be employed by the operating system to control fractal generation and provide flexibility in the fractal information schema.

An information fractal may include the entire tangle or only one or more regions within the tangle. A given fractal information schema may govern the entire tangle, or only one or more regions within the tangle. Information fractal regions within a tangle may include connections of elements and aggregations which are inconsistent with the fractal schema of the remainder of the region. These connections may be removed from consideration when applying the fractal schema to the remainder. Removing these inconsistent connections prevents the "spoilage" of the fractal region by the presence of a few non-conforming relationships. Thus the storage table system can tolerate inclusion of inconsistencies in both subject data and structure of relationships.

Information fractals have many fold-backs iterations of role UIDs and aggregate UIDs into the element column. These many iterations lead to a broad range of scales of self-similar relationships within relationships. The major portion of the aggregation nodes and role nodes in an interior fractal region are generally many fold-back iterations removed form the edge boundary of the tangle. Prior information systems support many different types of information relationships, but do not provide the above dynamic depth of scales of relationships.

A tangle of connecting paths may have a plurality of high-iteration fractal interior regions separated by low-iteration (or otherwise) non-fractal regions. For example, primary fractal region 38P (shown in FIG. 3) may be a primary data compilation concerning an information system such as English literature, while secondary fractal region 38S may be a secondary data compilation concerning a related information system such as Russian literature. The two literature fractals may interface along common events and notions such as wars and deities.

Alternatively, a tangle of connecting paths may have insufficient fold-back iterations of aggregation nodes and role nodes to create a fractal structure within the interior region. In such a non-fractal tangle, the major portion of the aggregation nodes and role nodes are adjacent to (or at least near) the edge boundary. These non-fractal portions do not exhibit a depth of relationships of relationships within the tangle.

TANGLE INTERFACES—FIGS. 4A 4B and 4C

Subject UIDs and aggregate UIDs and role UIDs stored in the tables may define a plurality of tangles of connecting paths as shown in FIG. 3, which edge interfaces with the subject data in several ways as shown in FIGS. 4A, 4B, and 4C. In the embodiment of FIG. 4A, tangle I and tangle II do not have any shared subject nodes or shared aggregation nodes or shared role nodes. Subject nodes A–C interface only with tangle I, and subject nodes D–F interface only with tangle II. Each tangle is completely separate from the other tangle representing independent information systems which do not have any common data or inter-tangle relationships. In the embodiment of FIG. 4B, tangle III and tangle IV have shared subject nodes A–C and shared aggregation nodes and shared role nodes. Subject nodes A–C interface with both tangle III and tangle IV. These tangles may be commingled representing information systems with many areas of common data with inter-tangle relationships. In the embodiment of FIG. 4C, tangle V and tangle VI have shared subject nodes A–C, but do not have any shared aggregation nodes or shared role nodes, representing independent information systems with common data but no inter-tangle relationships.

The interior region of one tangle may interface within the interior region of another tangle independently of an edge interface through shared subject nodes. For example, an entire tangle may form a single element in another tangle and be an enormous member of an aggregation. Various interior regions of a tangle may form various elements in another (or several other) tangles. Such an interior interface is represented in FIG. 3A by the overlap region between tangle I and tangle II.

METHOD OF DEFINING AN EXPANDABLE TANGLE—FIG. 5

Figure 5:
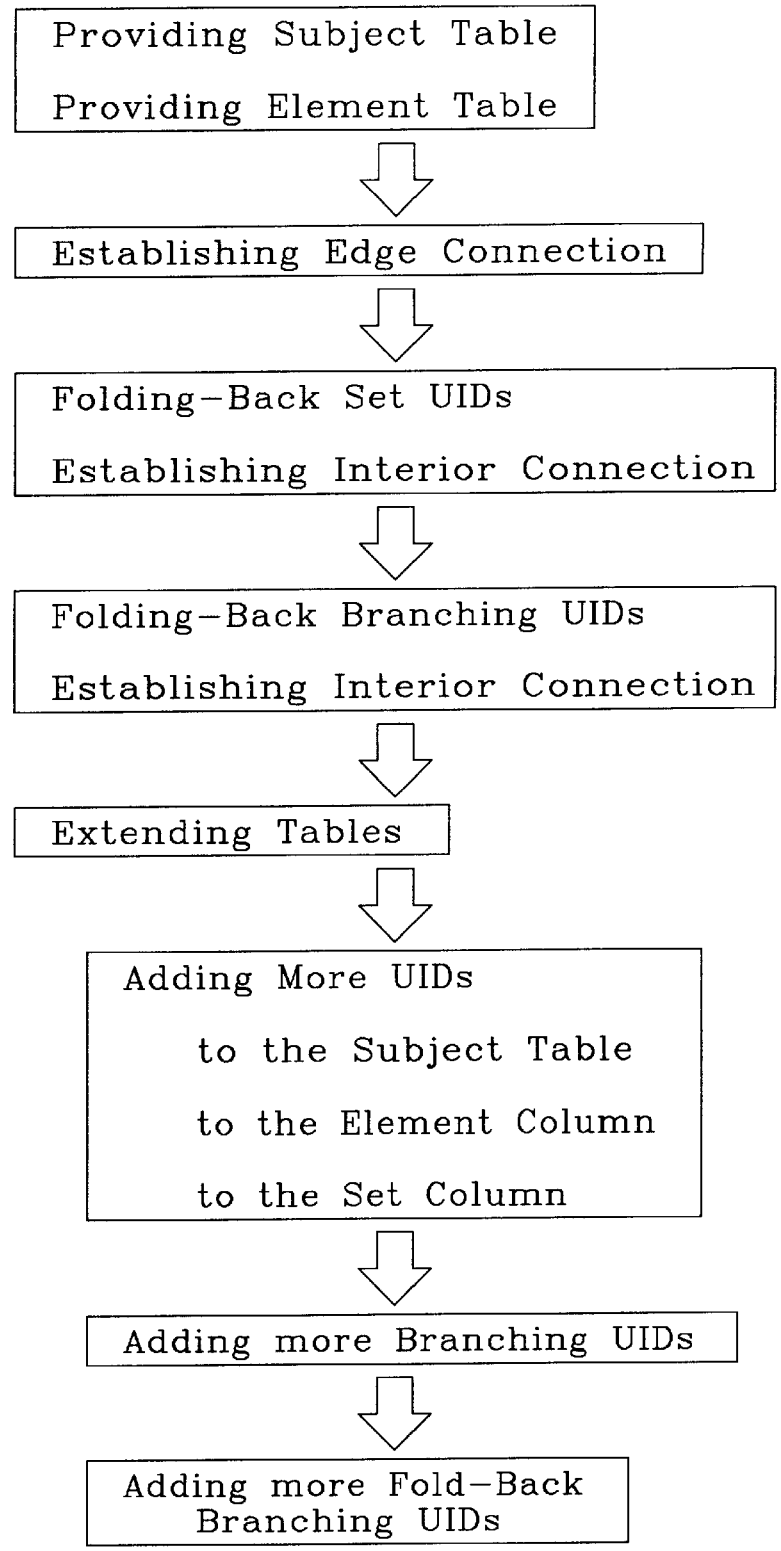
FIG. 5 is a flow chart showing a method of defining expandable tangles.

A method of defining an expandable tangle of connecting node paths is shown in the flow chart of FIG. 5. The tangle of the method spreads out between subject nodes and aggregation nodes and role nodes defined by subject UIDs and aggregate UIDs and role UIDs stored in extendable storage tables. The basic steps and sub-steps of the method are presented below.

Providing a subject table having a subject column of rows for storing subject UIDs defining subject nodes within the tangle of connecting paths. The subject nodes are path connected through the aggregation nodes and role nodes of the tangle to other subject nodes defined by other subject UIDs.

Providing an element table having an element column of rows for storing elements which are either subject UIDs connected to identical subject UIDs in the subject table, or aggregate UIDs or role UIDs. The element table also has an aggregate column of rows, for storing aggregate UIDs, and a role column of rows for storing role UIDs.

Establishing an subject connection between each subject UID in the element column, and an identical subject UID in the subject table.

Folding back certain aggregate UIDs from a row in the aggregate column into a different row of the element column.

Establishing an aggregate fold-back connection between aggregate UIDs in the aggregate column and identical fold-back aggregate UIDs in element column to create an aggregate UID to aggregate UID connection with a corresponding aggregation node to aggregation node interior path within the tangle of connecting paths.

Folding back certain role UIDs from a row in the role column into a different row of the element column.

Establishing a role fold-back connection between role UIDs in the role column and identical fold-back role UIDs in element column, to create a role UID to aggregate UID connection with a corresponding role node to aggregation node connection within the tangle of connecting paths.

Extending the columns of tables by adding rows of UIDs for expanding the tangle of connecting paths. The tangle of connecting paths created by the method has an edge boundary formed by the subject nodes and an interior region formed by the aggregation nodes and the role nodes and interior connecting paths. The above step of extending the columns of the tables may further comprise the following sub-steps for expanding the edge boundary of the tangle of connecting paths:

1) adding more subject UIDs to the subject table,
2) adding more subject UIDs to the element column with subject connections to identical subject UIDs in the subject table, and
3) adding more aggregate UIDs to the aggregate column with element connections to subject UIDs in the element column.

The above step of extending the columns of the tables may further comprise the following sub-steps for expanding the interior region of the tangle of connecting paths:

1) adding more role UIDs to the role column, and
2) adding more fold-back role UIDs to the element column with fold-back connections between the role UIDs and the fold-back role UIDs.

The above step of extending the columns of the tables also further comprises the following sub-steps for expanding the interior region of the tangle of connecting paths:

1) adding more aggregate UIDs to the aggregate column, and
2) adding more fold-back aggregate UIDs to the element column with fold-back connections between the aggregate UIDS and the fold-back aggregate UIDs.

These extensions of the UID tables are not limited by a pre-existing schema of organization. Each UID may be connected into any relationship with any other UID or UIDs in any order to provide the required information structure.

INDUSTRIAL APPLICABILITY

It will be apparent to those skilled in the art that the objects of this invention have been achieved as described hereinbefore by providing an extendable UID storage system and method for receiving UIDs and providing UID connections which specify relationships between the UIDs. The UID storage system and method may be extended indefinitely for receiving additional UIDs specifying additional relationships of increasing complexity between the UIDs. The UID storage system and method specify the relationship between each new UID and the existing UIDs as the system is extended, defining a tangle of connecting paths between the UIDs having fractal relationship structures.

CONCLUSION

Clearly various changes may be made in the construction and embodiments shown herein without departing from the concept of the invention. Further, features of the embodiments shown in the various figures may be employed with the embodiments of the other figures.

Therefore, the scope of the invention is to be determined by the terminology of the following claims and the legal equivalents thereof.

I claim as my invention:

1. An extendable UID storage system for storing subject UIDS and aggregate UIDS and role UIDS, which system specifies the relationship between the UIDS and defines an expandable tangle of connecting paths between subject nodes and aggregation nodes and role nodes, corresponding to the subject UIDS and aggregate UIDS and role UIDS in the storage system, comprising:

subject UIDs, each defining a subject node within the tangle of connecting paths, which subject nodes are path connected through the tangle to other nodes defined by other UIDs;

aggregate UIDs, each defining an aggregation node within the tangle of connecting paths, and each aggregate UID having an aggregation of UID elements;

role UIDs, each defining a role node within the tangle of connecting paths, for providing a role connection between other UIDs;

a subject table having a subject column of rows at least some rows of which have a subject UID stored therein;

an element table having an element column of rows at least some rows of which have an UID element stored therein, which UID element is either a subject UID connected to an identical subject UID in the subject table, or an aggregate UID, or a role UID;

the element table having an aggregate column of rows, at least some rows of which have an aggregate UID stored therein, each of the aggregate UIDs forms an element connection with the UID element stored in the element column along the same row therewith;

identical aggregate UIDs in the aggregate column determine the aggregation of UID elements through the element connections with the UID elements;

the element table having a role column of rows, at least some rows of which have a role UID stored therein; and the columns of the subject table and the element table are extendable without constraint by adding rows of UIDs which expand the tangle of connecting paths increasing the number of connections and advancing the complexity of connections between the subject nodes defined by the subject UIDs.

2. The UID storage system of claim 1, wherein the number of elements in the aggregation for a given aggregate UID is equal to the number of times that aggregate UID appears in the aggregate column of the element table.

3. The UID storage system of claim 1, wherein the tables are virtual tables distributed throughout the storage system each containing an aggregation of UID entries, and the columns are virtual columns distributed within the virtual tables.

4. The UID storage system of claim 1, wherein the tables are actual tables localized in the storage system each containing an aggregation of UID entries, and the columns are actual columns localized within the actual tables.

5. The UID storage system of claim 1, wherein the UID elements stored in the rows of the element column include all of the subject UIDs stored in the subject table.

6. The UID storage system of claim 1, wherein the subject table further comprises a data column of rows in addition to the subject column of rows, at least some rows of which have a subject datum stored therein which is identified by the subject UID stored along the same row therewith.

7. The UID storage system of claim 6, further comprising a data memory means having a memory interface connection with the subject data in the data column of rows.

8. The UID storage system of claim 1, further comprising:

an aggregation table extendable without constraint, having an aggregate column of rows at least some of which have an aggregate UID stored therein, and inter-table aggregation connections connecting identical aggregate UIDs in the aggregate column of the element table to an identical aggregate UID in the aggregation table.

9. The UID storage system of claim 1, further comprising nascent role UIDs, stored in the role column in rows which do not store a role UID.

10. The UID storage system of claim 9, wherein as the columns of the storage table and element table are extended, an UID is stored in each row of each column of each table establishing a fully packed configuration.

11. The UID storage system of claim 1, further comprising an UID generator for providing the UIDs stored in the tables.

12. The UID storage system of claim 11, wherein the UID generator provides the UIDs on a random basis.

13. The UID storage system of claim 11, wherein the UID generator provides the UIDs on a sequential basis.

14. The UID storage system of claim 1, wherein the subject UIDs and the aggregate UIDs and the role UIDs in the element table define a plurality of tangles of connecting paths.

15. The UID storage system of claim 14, wherein the plurality of tangles of connecting paths have shared subject nodes and shared aggregation nodes and shared role nodes.

16. The UID storage system of claim 14, wherein the plurality of tangles of connecting paths have shared subject nodes, but do not have shared aggregation nodes or shared role nodes.

17. The UID storage system of claim 14, wherein the plurality of tangles of connecting paths do not have shared subject nodes or shared aggregation nodes or shared role nodes.

18. The UID storage system of claim 1, wherein
the UID elements stored in the rows of the element column include fold-back aggregate UIDs which are aggregate UIDs folded-back from a row in the aggregate column into a different row of the element column to create an aggregate UID to aggregate UID connection,
the aggregation of UID elements belonging to each fold-back aggregate UID form a single element belonging the aggregation of the aggregate UID stored in the aggregate column along the same row as that fold-back aggregate UID,
creating an aggregation within an aggregation within the tangle of connecting paths.

19. The UID storage system of claim 18, wherein an additional aggregate UID to aggregate UID connection and an additional aggregation within an aggregation is created for each additional fold-back of an aggregate UID into the element column.

20. The UID storage system of claim 18, wherein the UID elements stored in the rows of the element column include fold-back role UIDs which are role UIDs folded-back from a row in the role column into a different row of the element column creating a role connection within the tangle of connecting paths.

21. The UID storage system of claim 20, wherein a fold-back role UID in the element column may be a member of the aggregation of the element connection along the same row as the identical role UID forming a multiple inclusion.

22. The UID storage system of claim 20, wherein the role connection provided by each role UID in the role column and the identical fold-back role UID in the element column is between the aggregate UID in the same row as the fold-back role UID and the element connection along the same row as the role UID.

23. The UID storage system of claim 22, wherein an additional role connection is formed for each additional appearance of a fold-back role UID in the element column for creating an additional connection of an aggregate UID to an element connection.

24. The UID storage system of claim 20, wherein
the tangle of connecting paths has an edge boundary formed by the subject nodes, and an interior region formed by the aggregation nodes and the role nodes, and
the connecting paths between the subject nodes and the interior region are edge connecting paths, and
the connecting paths between the aggregation nodes and the role nodes in the interior region are interior connecting paths.

25. The UID storage system of claim 24, wherein the tangle of connecting paths has sufficient fold-back iterations of aggregation nodes and role nodes to create a high-iteration fractal pathing structure within the interior region of the tangle, in which the major portion of the aggregation nodes and role nodes are many fold-back back iterations removed from the edge boundary and are continuously connected within the interior region at fold-back iterations.

26. The UID storage system of claim 25, wherein the tangle of connecting paths has a plurality of high-iteration fractal interior regions separated by low-iteration non-fractal regions.

27. The UID storage system of claim 24, wherein the tangle of connecting paths has insufficient fold-back iterations of aggregation nodes and role nodes to create a fractal structure within the interior region thereof.

28. The method of defining an expandable tangle of connecting paths between subject nodes and aggregation nodes and role nodes, from subject UIDs and aggregate UIDs and role UIDs stored in extendable storage tables, comprising the steps of:
providing a subject table having a subject column of rows for storing subject UIDs defining subject nodes within the tangle of connecting paths, which subject nodes are path connected through the aggregation nodes and role nodes of the tangle to other nodes defined by other UIDs;
providing an element table having an element column of rows for storing elements which are either subject UIDs connected to identical subject UIDs in the subject table, or aggregate UIDs or role UIDs, an aggregate column of rows, for storing aggregate UIDs, and a role column of rows for storing role UIDs, which element table provides an element connection between each element in the element column and the aggregate UID in the aggregate column along the same row therewith;
establishing a subject connection between each subject UID in the element column, and an identical subject UID in the subject table;
folding back certain aggregate UIDs from a row in the aggregate column into a different row of the element column;
establishing an fold-back connection between aggregate UIDs in the aggregate column and identical fold-back aggregate UIDs in element column to create an aggregate UID to aggregate UID connection with a corresponding aggregation node to aggregation node interior connection within the tangle of connecting paths;
extending the columns of tables by adding rows of UIDs for expanding the tangle of connecting paths.

29. The method of claim 28, further comprising the additional steps of:

folding back certain role UIDs from a row in the role column into a different row of the element column; and establishing an fold-back connection between role UIDs in the role column and identical fold-back role UIDs in element column, to create a role UID to aggregate UID connection with a corresponding role node to aggregation node connection within the tangle of connecting paths.

30. The method of claim 29, wherein the tangle of connecting paths has an edge boundary formed by the subject nodes, and an interior region formed by the aggregation nodes and the role nodes.

31. The method of claim 30, wherein the step of extending the columns of the tables further comprises:

adding more subject UIDs to the subject table, adding more subject UIDs to the element column with subject connections to identical subject UIDs in the subject table, and adding more aggregate UIDs to the aggregate column with element connections to subject UIDs in the element column, for expanding the edge boundary of the tangle of connecting paths.

32. The method of claim 30, wherein the step of extending the columns of the tables further comprises:

adding more aggregate UIDs to the aggregate column, adding more fold-back aggregate UIDs to the element column, with fold-back connections between the aggregate UIDS and the fold-back aggregate UIDs, for expanding the interior region of the tangle of connecting paths.

33. The method of claim 30, wherein the step of extending the columns of the tables further comprises:

adding more role UIDs to the role column, and adding more fold-back role UIDs to the element column, with fold-back connections between the role UIDs and the fold-back role UIDs, for expanding the interior region of the tangle of connecting paths.

\* \* \* \* \*